United States Patent [19]

Metz, Jr. et al.

[11] Patent Number: 5,448,701
[45] Date of Patent: Sep. 5, 1995

[54] FLOW CONTROLLER FOR SHARED BUS USED BY PLURAL RESOURCES

[75] Inventors: Walter C. Metz, Jr., Raleigh; Andrew J. Rindos, III, Durham, both of N.C.

[73] Assignee: International Business Machines Corporation, Armonk, N.Y.

[21] Appl. No.: 994,849

[22] Filed: Dec. 22, 1992

[51] Int. Cl.6 ............................................. G06F 13/36
[52] U.S. Cl. ........................... 395/293; 395/200.02; 395/849; 395/854; 395/873
[58] Field of Search ............. 395/325, 250, 750, 425, 395/200

[56] References Cited

U.S. PATENT DOCUMENTS

| | | | |
|---|---|---|---|
| 4,298,954 | 11/1981 | Bigelow et al. | 395/250 |
| 4,675,865 | 6/1987 | DeVries et al. | 370/85.1 |
| 4,720,784 | 1/1988 | Radhakrishnan et al. | 395/325 |
| 4,777,595 | 10/1988 | Strecker et al. | 395/200 |
| 5,247,626 | 9/1993 | Firoozmand | 395/250 |
| 5,276,681 | 1/1994 | Tobagi et al. | 370/85.4 |
| 5,299,313 | 3/1994 | Petersen et al. | 395/200 |
| 5,365,552 | 11/1994 | Astle | 375/106 |

Primary Examiner—Jack B. Harvey
Assistant Examiner—Glenn A. Aave
Attorney, Agent, or Firm—Joscelyn G. Cockburn

[57] ABSTRACT

The flow controller utilizes intelligent adapters to connect plural resources to a bus and a central arbiter that decides which adapters have access to the bus for the next bus cycle. Each adapter has an input buffer for transmitting data onto the bus, an output buffer for receiving data from the bus and a target register that identifies the destinations of the data in the input buffer. Each adapter communicates over control lines separate from the bus the following information: if its input buffer is nearly full, if its output buffer is either nearly empty or nearly full and the contents of its target register. The central arbiter gives highest priority to those adapters having nearly full input buffers with data for non-full output buffers, next highest priority to those adapters having nearly empty output buffers with data targeted by an input buffer and lowest priority to adapters with less than full input buffers having data for non-empty output buffers.

20 Claims, 10 Drawing Sheets

FLOW CONTROLLER FOR SHARED BUS USED BY PLURAL RESOURCES

FIELD OF THE INVENTION

The present invention relates to data processing systems that have plural resources that transmit and receive data over a shared bus.

BACKGROUND OF THE INVENTION

In a data processing system, shared buses are used to interconnect plural resources together. For example, a data bus could be shared by various local area networks (LANs). The LANs transfer data between each other over the shared data bus.

Because of the potential of congestion that could arise with many resources using a single bus, some mechanism must be provided to control the trafficking of data over the bus. A controller shapes the traffic on a bus by passing traffic generated by resources onto the bus, by delaying traffic or by blocking traffic from the bus. Prior art controllers utilize gating mechanisms that simply pass and/or block arrivals to and from the bus.

In addition to controllers, the prior art utilizes arbiters to control the trafficking of data over the bus. Arbiters typically utilize priority schemes to determine which particular resource gains access to the bus.

Prior art arbiters operate from the bus. When a resource needs to transmit data on the bus, it transmits its request on the bus to the arbiter. The arbiter enqueues the request and determines which resource can transmit on the bus. Because the bus is used to transmit not only data, but also requests, and because some bus cycles are used to transmit information between the arbiter and the resources, the data carrying capacity of the bus is reduced.

Furthermore, prior art arbiters consider only the source (that is the transmitting resource) of a given bus access request. The arbiters do not consider the status of a receiving resource. Therefore, a particular receiving resource that has not had data sent to it for some period of time may run out of data to process. This situation does not allow for the efficient use of the resources.

SUMMARY OF THE INVENTION

It is an object of the present invention to provide a flow controller for selecting a specific resource that can access a shared bus, which flow controller operates in the background of the bus while the bus is in use in order to maximize throughput of data over the bus.

It is a further object of the present invention to provide a flow controller for a shared bus which selects bus resources that can access the bus based on the receiving resource as well as the transmitting resource, so that a receiving resource will have a minimum amount of time in which it has no bus data to process.

The present invention provides a method and a system for controlling access by plural resources to a bus that is shared by the resources. Each of the resources have first storage means for storing data to be transmitted onto the bus and second storage means for receiving data from the bus. Each of the first and second storage means has a data storage capacity. The method of the present invention obtains fullness information on the amount of data contained in each of the first storage means and the second storage means. Then, the present invention determines from the fullness information which resource is to have access to the bus for transmitting data from its first storage means and which resource is to have access to the bus for receiving data into its second storage means.

In one aspect of the present invention, target information on the identity of the second storage means targeted by data in each first storage means is obtained and that information is used along with the fullness information to determine which resources are to have access to the bus.

In still another aspect of the present invention, the determination of which resources are to have access to the bus includes the determination from the fullness information and the target information if there exists a first set of the first and second storage means, which comprises a first storage means that is nearing fullness with data for a non-full second storage means. If there exists no first set, then the present invention determines if there exists a second set of first and second storage means which comprises a second storage means that is nearly empty and a first storage means with data that is targeted for the nearly empty second storage means. If there exists a second set, then that set is given access to the bus.

The present invention maximizes throughput of data over the bus in several ways. First, the present invention operates in the background of the bus. Control lines, that are separate from the bus, provide a central arbiter information on the fullness of storage means in each resource and also information on the targeted resource for the data waiting to be transmitted on the bus. Thus, the central arbiter need not obtain information from the bus to decide what resources gain access to the bus. Furthermore, the central arbiter decides access while the bus is in use transmitting data between resources. Thus, bus time is not taken up by the arbiter deciding access.

Second, the present invention looks to the relative fullness of the transmitting storage means to determine if any of the transmitting storage means are nearly full. In addition, it is determined if any of the receiving storage means that are targeted for data by the nearly full transmitting storage means are non-full and thus are capable of receiving data. If such a set of storage means are found, then their resources are given access to the bus in order to avoid overfilling the nearly full transmitting storage means. If no such set is found, then the present invention looks to the relative emptiness of the receiving storage means to determine if any receiving storage means is nearly empty. If such a receiving storage means is found, and there is data for it in a transmitting storage means, then that set of storage means is given access to the bus. This prevents a receiving storage means from going empty, which could cause its respective resource to be underutilized due to a lack of data.

BRIEF DESCRIPTION OF THE DRAWINGS

FIGS. 5A and 5B are diagrams showing logic circuits for when I equals 1 (indicating that at least one nearly full input buffer exists, with data for a non-full output buffer).

FIGS. 7A and 7B are diagrams showing logic circuits for when I equals 0 (indicating that no nearly full input buffer with data for a non-full output buffer exists).

DESCRIPTION OF THE PREFERRED EMBODIMENT

Figure 1:
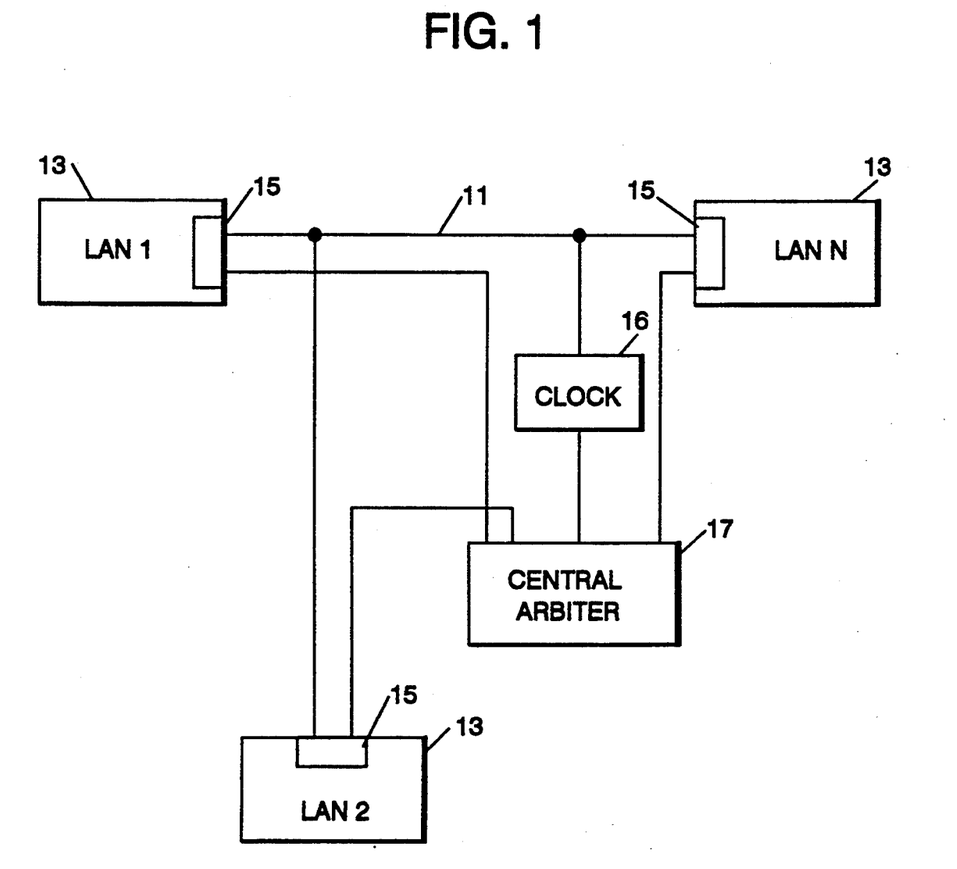
FIG. 1 is a block diagram showing a shared bus servicing plural resources, such as local area networks, along with the controller system of the present invention, in accordance with the present invention.

In FIG. 1, there is shown a block diagram of the controller system of the present invention, in accordance with a preferred embodiment. The controller system controls the flow of data over a high bandwidth bus 11. The bus 11 is utilized by plural resources 13, such as local area networks (LANs), to communicate with one another. The resources 13 are connected to the bus by way of adapters 15. For an n number of resources, there are n adapters.

The adapters 15 are typically the interface modules of a particular resource. Thus, for example, a first LAN would be connected to the bus by adapter #1, a second LAN would be connected to the bus by adapter #2 and so on until an nth LAN would be connected to the bus by adapter #n. The adapters allow the LANs to communicate with each other over the bus. A clock 16 is provided to synchronize all of the LANs and the controller system with each other.

The controller system of the present invention includes the adapters 15 and a central arbiter 17 connected to the adapters.

Figure 2:
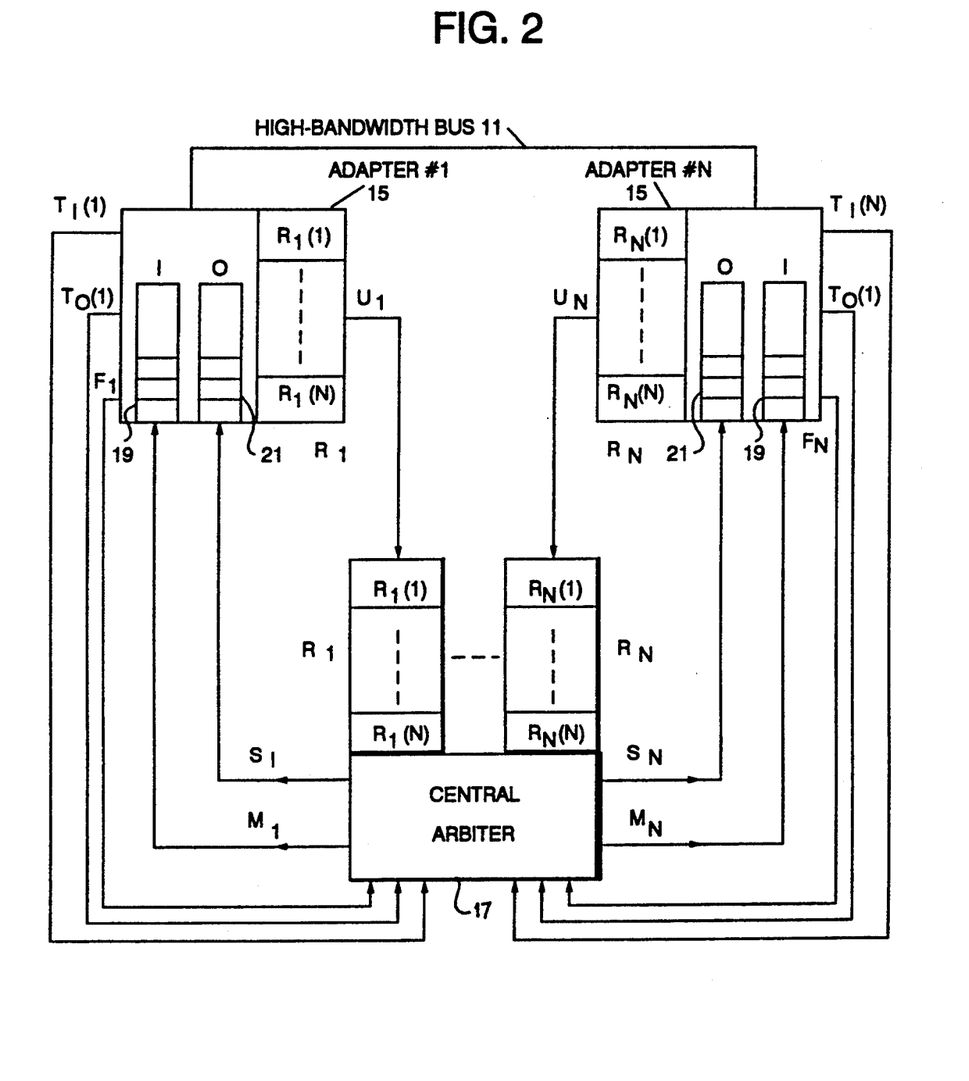
FIG. 2 is a block diagram showing a detailed view of the controller system.

Referring to FIG. 2, each adapter 15 has an input buffer 19 and an output buffer 21 that are connected to the bus 11. The input buffer receives data from the adapter's LAN. The adapter 15 transmits the data from its input buffer 19 onto the bus 11 to another adapter and LAN. The adapter receives data from the bus 11 into its output buffer 21. The adapter then outputs the data from the output buffer to its respective LAN. The input and the output buffers are connected to their resources by lines (not shown).

The central arbiter 17 controls the adapters 15 by determining which adapter can transmit data from its input buffer 19 onto the bus 11 and which adapter receives the transmitted data from the bus into its output buffer 21. Thus, the central arbiter maintains control of the flow of data along the bus.

In so controlling data flow along the bus, the controller system determines if an input buffer is almost full and if there exists an output buffer that will accept the data for the almost full input buffer. If such a set of input and output buffers exists, then the adapters containing those buffers are granted the buffer arbiter for gaining access to the bus. This minimizes the possibility of having an input buffer overflowing with data, a situation that leads to the loss of data due to the input buffer being filled beyond its capacity. If there is no almost full input buffer, then the controller system determines if an output buffer is nearly empty and if an input buffer exists with data for the nearly empty output buffer. If such a set of buffers exists, then the adapters containing those buffers are granted priority for gaining access to the bus. This maintains data in the output buffer so that the respective resource always has work to do (and is therefore working at capacity). If there is no nearly empty output buffer, then the controller system determines if there exists merely a non-full output buffer, that is an output buffer that can accept data. The non-full output buffer is matched with an input buffer having data targeted for that output buffer.

In the event that there is a tie at a level of priority (for example there are two sets of nearly full input buffers with data for non-full output buffers), then a buffer arbiter breaks the tie using predetermined priority inputs for the adapters. The priority inputs can be static or they can be dynamic, as in, for example, a rotating priority. Priority generators are used to produce the priority inputs. The rotating priority is based on the ability of the output buffers to empty and the input buffers to fill. The fastest buffers are allowed more opportunities to access the bus than are the slowest buffers.

The adapters 15 described herein are referred to as intelligent adapters. Each adapter is made up of one or more microprocessors, sufficient memory and the microcode appropriate for the functions described below. The memory can be partitioned either physically or logically into input and output buffer spaces.

Each buffer can enqueue data received into its input and output buffers, either physically or logically. In addition, each adapter can retrieve the enqueued data from the respective buffers for placement onto the bus (in the case of an input buffer) or for passing onto the adapter's LAN (in the case of an output buffer). In addition, each adapter can manipulate header data to determine the target or destination LAN of a block of data that the adapter has received into its input buffer. For example, if adapter #1 receives data from its LAN for transmission over the bus to LAN 2, then the adapter #1 would determine that the output buffer of adapter #2 was the target for this particular block of data. Each adapter #i maintains a target register $R_i$ to maintain this information. Each target register $R_i$ has n bits, one bit for each adapter. Each register $R_i$ is a register of n flip-flops. (For simplicity, the target register is shown as having n-bits, even though bit $R_1(1)$ for adapter #1, $R_2(2)$ for adapter #2 and so on designate the output buffers in the same adapters #1, #2 and so on. It is unlikely that an adapter would send data from its input buffer to its output buffer over the bus).

Each adapter 15 also maintains one or more control lines that communicate with the central arbiter 17. The control lines advise central arbiter 17 of the capacity of the input and output buffers 19, 21 of an adapter and also the targeted output buffers for the data in the input buffer of a particular adapter. Specifically, each adapter #i has the following control lines: $T_I(i)$, $T_O(i)$, $F_i$ and $U_i$. The control line $T_I(i)$, when active, indicates that the input buffer of adapter #I has exceeded a predefined threshold and is in danger of overflowing. Thus, if $T_I(1)$ is high, this indicates that the input buffer of adapter #1 is nearly full. If the input buffer is not allowed to empty some of its data onto the bus, then any additional data from LAN 1 going into the input buffer of adapter #1 would probably result in losing some data, because the input buffer is filled beyond its capacity. If control line $T_O(i)$ is active, then this indicates that the output buffer of adapter #i has exceeded a predefined threshold and is in danger of going empty. Thus, if $T_O(1)$ is high, then the output buffer of adapter #1 is almost empty. If control line $F_i$ is active, then this indicates that the output buffer of adapter #i is full and unable to receive data. Therefore, no data should be sent to it.

Line $U_i$ serially transmits to the central arbiter 17 the contents of the adapter's target register $R_i$. The central arbiter has a corresponding register R for each adapter. Each central arbiter register R is made up of n flip-flops. Thus, line $U_i$ updates the central arbiter with changes in the adapter's register.

The central arbiter 17 includes, in addition to the registers $R_i$, circuits for updating the central arbiter registers (FIG. 3), circuits for producing various control lines (FIGS. 4A–4E), circuits for selecting the transmitting adapter (FIGS. 5A and 7B), circuits for selecting the receiving adapter (FIGS. 5B and 7A), a buffer arbiter (FIG. 6) for each selection circuit of FIGS. 5A, 5B, 7A and 7B and priority generators for each LAN (FIG. 8).

Figure 3:
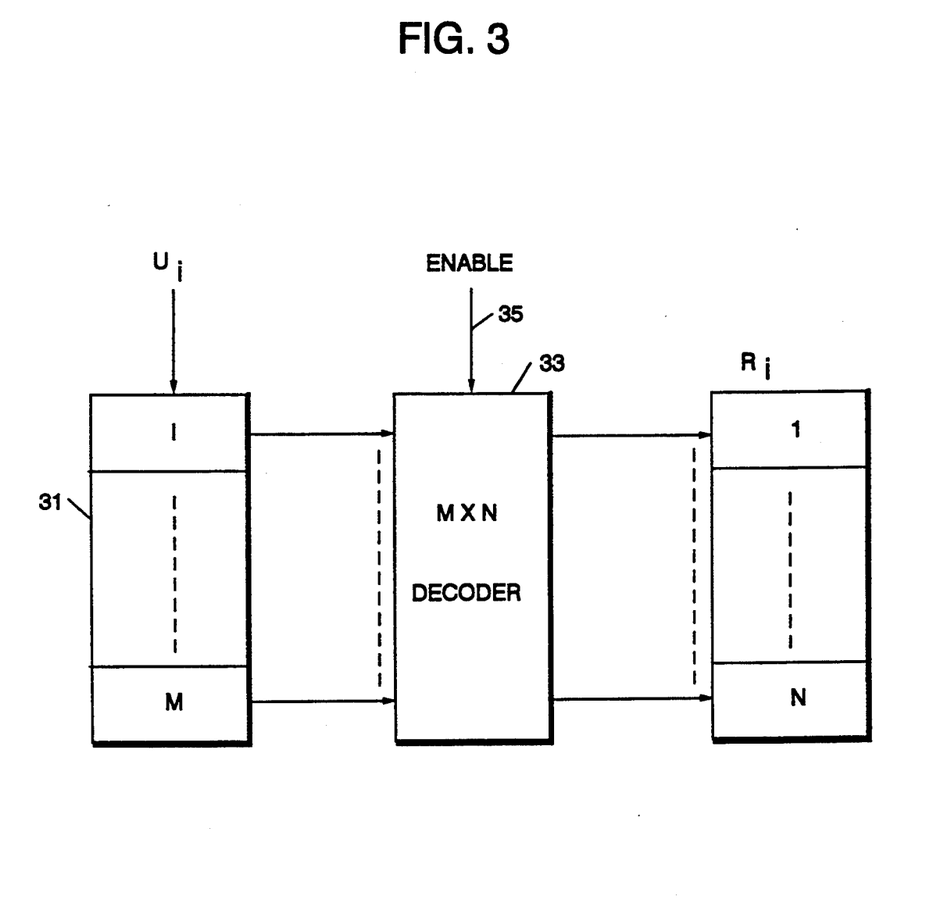
FIG. 3 is a block diagram showing the logic circuit for updating the register $R_i$ in the central arbiter.

In FIG. 3, there is shown a block diagram showing the central arbiter logic for updating register $R_i$ in the central arbiter. Control line $U_i$ is a binary serial line that is connected to the input of an m-bit shift register 31, where $m = \log 2(n)$ rounded up to the nearest integer. The m-bit outputs of the shift register are connected to the m-bit inputs of an $m \times n$ decoder 33. The decoder 33 also has an enable input 35. The n outputs of the decoder 33 are connected to the n-bits of the shift register $R_i$.

To illustrate the operation of this logic circuit of FIG. 3, suppose that adapter #i received a packet of data for adapter #3 for the first time (that is, the central arbiter register $R_i(3) = 0$ up to that point. Adapter #i would serially transmit binary 3 (011) along line $U_i$ to the central arbiter, wherein it would be stored in the shift register 31. This information is passed on as m to the decoder 33, wherein the decoder output line #3 flips $R_i(3)$ from 0 to 1. If the adapter #i has transmitted the last packet of data it had for adapter #3, then the same sequence of events would flip $R_i(3)$ from 1 to 0.

Each adapter is also connected to the central arbiter by way of lines $M_i$ and $S_i$. Line $M_i$ is used by the central arbiter to inform adapter #i that it is to be the transmitter of data on the bus during the next bus transaction. Line $S_i$ is used by the central arbiter to inform adapter #i that it is to be the receiver of data from the bus during the next bus transaction.

Although the control lines $T_I(i)$, $T_O(i)$, $F_i$, $U_i$, $M_i$ and $S_i$ have been shown as discrete lines, the number of lines could be reduced by using serial buses between the respective adapters and the central arbiter. The serial buses would transmit the control information between the adapters and the central arbiter. For example, information equivalent to that conveyed by $T_I(i)$, $T_O(i)$ and $F_i$ would all be transmitted serially along a single line using a binary code, with the required encoding and decoding logic at either end. Similarly, information equivalent to $M_i$ and $S_i$ could be transmitted along a serial bus connected to all of the adapters. Given appropriate codes for start and end of transmission, and other necessary information, the first burst of data would indicate the number of the adapter which is to serve as the next transmitter, while the second burst would indicate the number of the adapter which is to serve as the next receiver.

Whichever arrangement is used, discrete control lines or serial buses, the communication pathway is independent of the bus 11. The serial transmissions on the control lines occur simultaneously and asynchronously to activity on the shared bus, thereby minimizing the impact on bus performance.

Figure 4A:
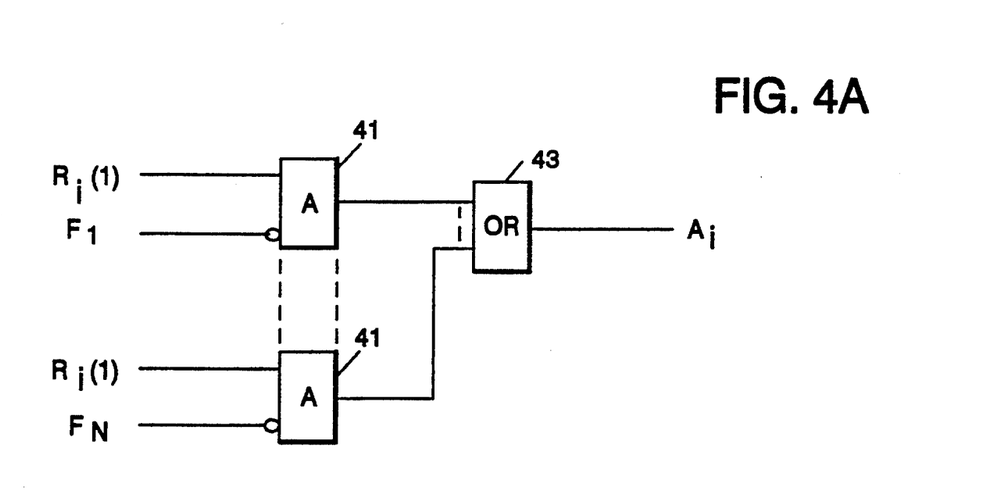
FIGS. 4A–4E are diagrams showing logic circuits for generating control lines in the central arbiter.

The central arbiter 17, besides containing the registers $R_i$ which are updated by the adapters over lines $U_i$, contains logical circuits for controlling which adapters have access to the bus. In FIGS. 4A–4E, there are shown logic circuits for generating additional control lines from the control lines provided by the adapters. In FIG. 4A, a control line $A_i$ is generated from the central arbiter register $R_i$ for adapter #i and from adapter lines $F_1$ through $F_n$. When line $A_i$ is active, it indicates that adapter #i has data in its input buffer (indicated by $R_i$) for at least one non-full output buffer (indicated by lines $F_1$ to $F_n$). As shown in FIG. 4A, there are provided n AND gates 41, one gate for each bit of register $R_i$. Each AND gate 41 has two inputs, namely a respective jth bit of register $R_i$ and the corresponding line $F_j$, which is inverted. The outputs of all of the AND gates 41 are each connected to a respective input of an OR gate 43. The output of the OR gate 43 is control line $A_i$.

Figure 4B:
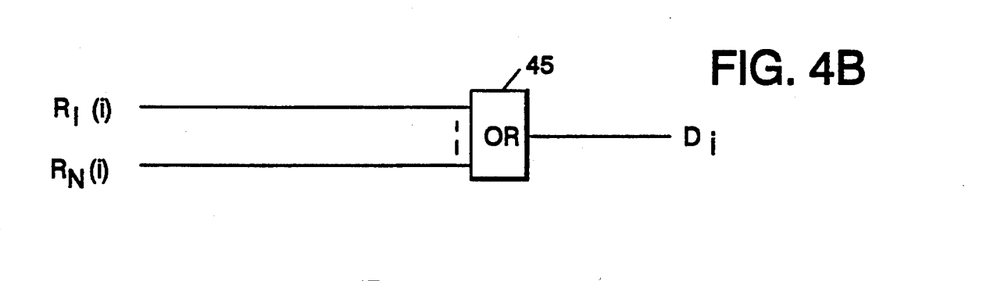

In FIG. 4B, the logic circuit for control line $D_i$ is shown. When line $D_i$ is active, it indicates that data exists in some adapter's input buffer for the output buffer of adapter #i. The ith bit of each of the n registers in the central arbiter is connected to a respective input of an OR gate 45. The output of the OR gate 45 is control line $D_i$.

Figure 4C:
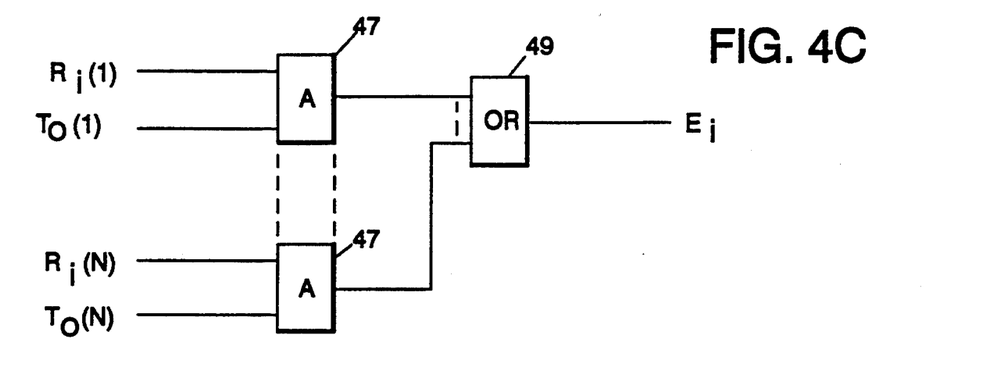

In FIG. 4C, the logic circuit for control line $E_i$ is shown. When line $E_i$ is active, it indicates that adapter #i has data in its input buffer (as indicated by $R_i$) for at least one nearly empty output buffer (as indicated by line $T_O$). There are provided n AND gates 47. Each AND gate 47 has two inputs, namely a respective jth bit of register $R_i$ and the line $T_O(j)$. The outputs from the AND gates 47 are connected to respective inputs of an OR gate 49. The output of the OR gate 49 is line $E_i$.

Figure 4D:
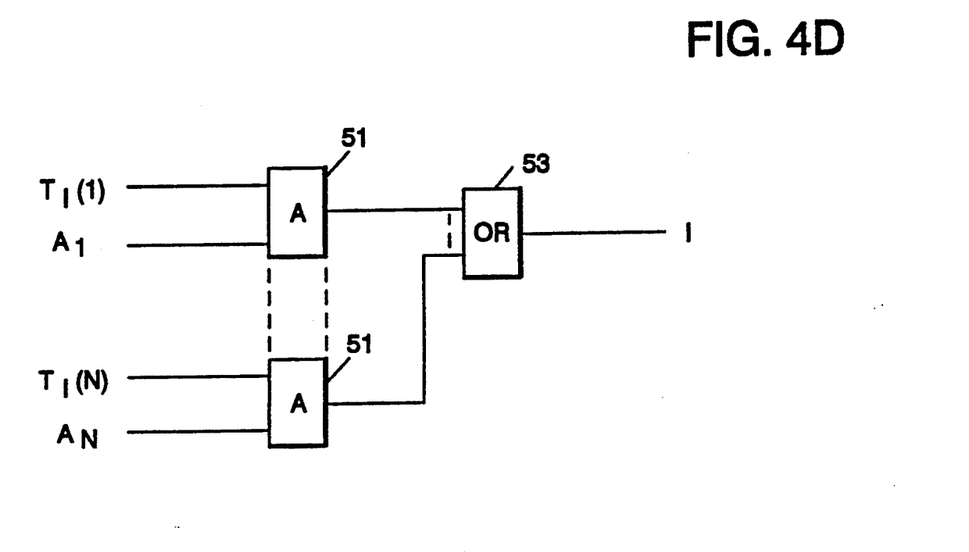

Control lines $A_i$ and $D_i$ are used to generate two more control lines, namely I and O. The logic circuit for control line I is shown in FIG. 4D. When line I is active (that is $I = 1$), it indicates the existence of one nearly full input buffer, with data that can be sent to at least one non-full output buffer ($A_i$ is 1 for some i). There are an n number of AND gates 51. Each AND gate 51 has two inputs, with one input being connected to the control line $T_I(i)$ and the other input being connected to the control line $A_i$. The outputs of the AND gates 51 are connected to respective inputs of an OR gate 53. The output of the OR gate is control line I.

Figure 4E:
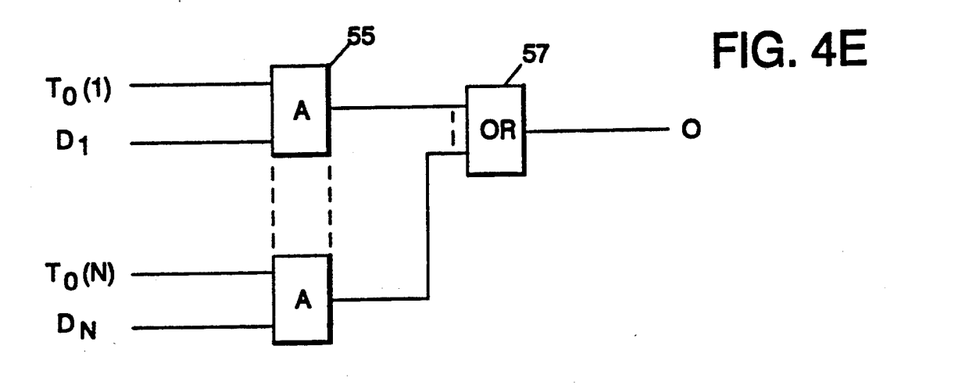

The logic circuit for control line O is shown in FIG. 4E. When line O is active, it indicates the existence of at least one nearly empty output buffer, for which data exists in the input buffer of at least one other adapter ($D_i$ is 1 for some i). There are an n number of AND gates 55. One input of each AND gate 55 is connected to the control line $T_O(i)$ and the other input is connected to the control line $D_i$. The outputs of the AND gates are connected to respective inputs of an OR gate 57. The output of the OR gate is control line O.

Figure 5A:
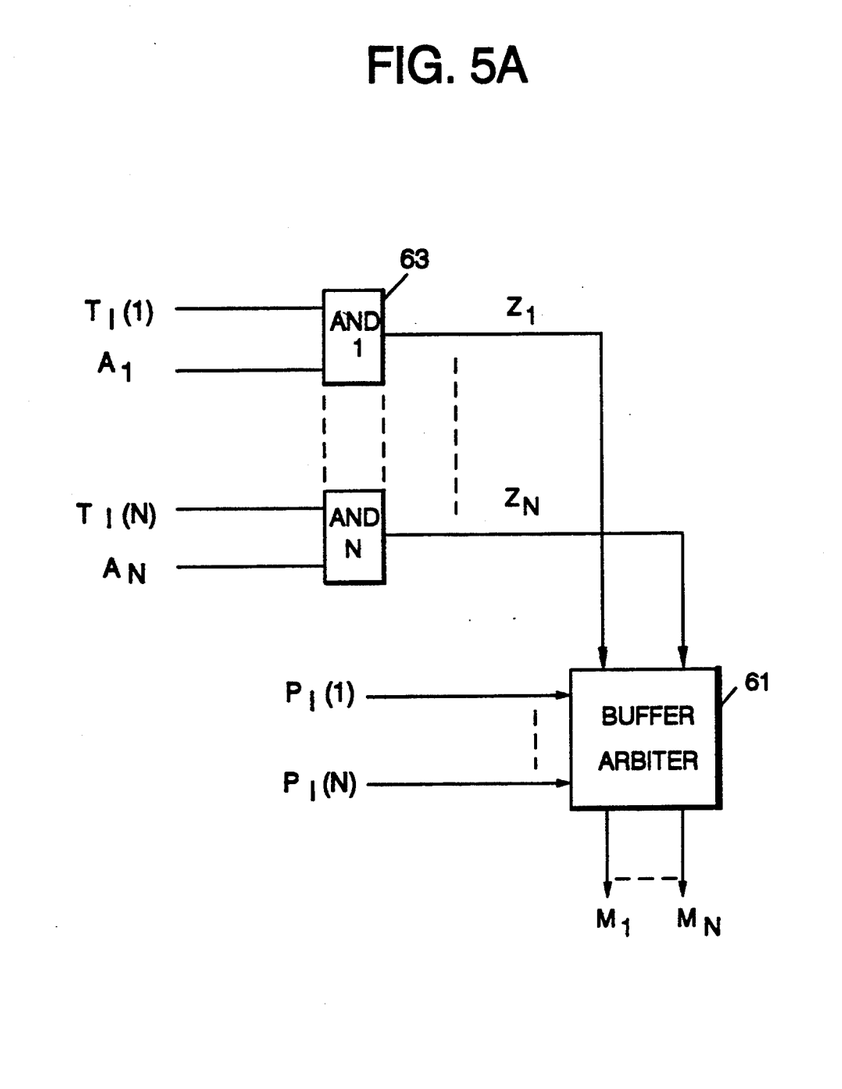
FIG. 5A shows the logic circuit for defining the transmitter adapter.
Figure 5B:
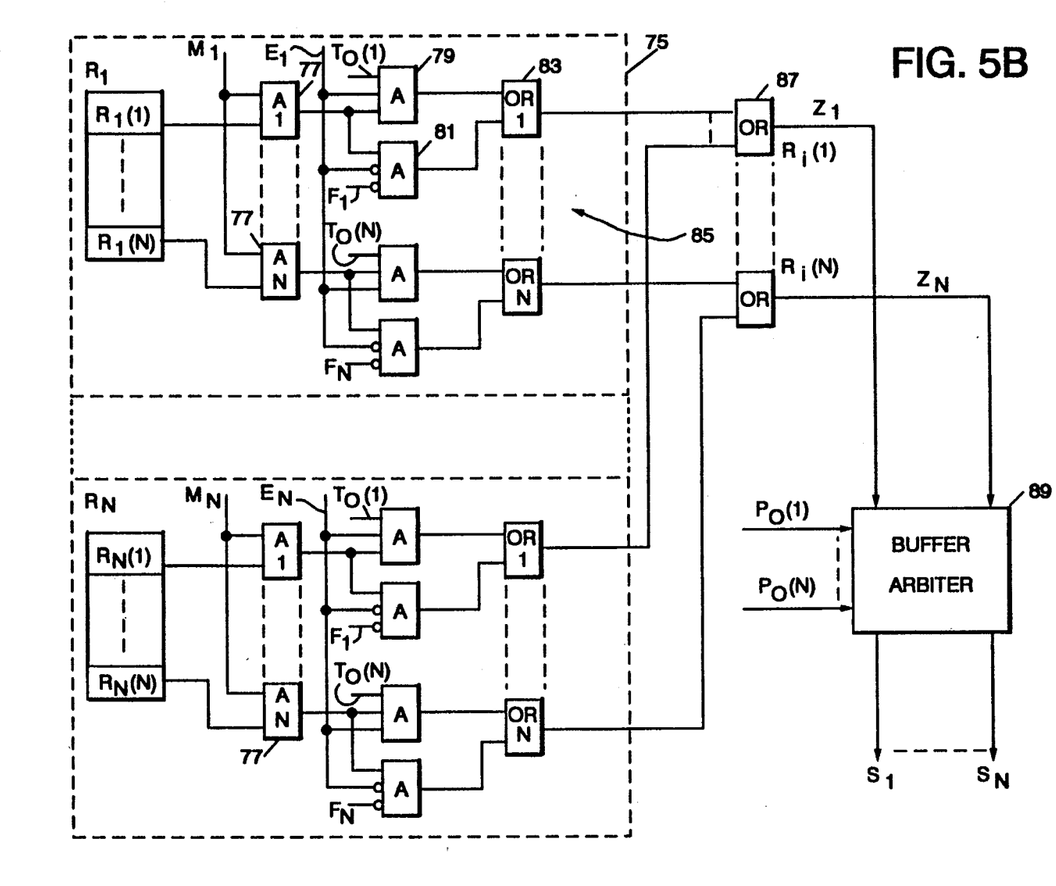
FIG. 5B shows the logic circuit for defining the receiver adapter.
Figure 7A:
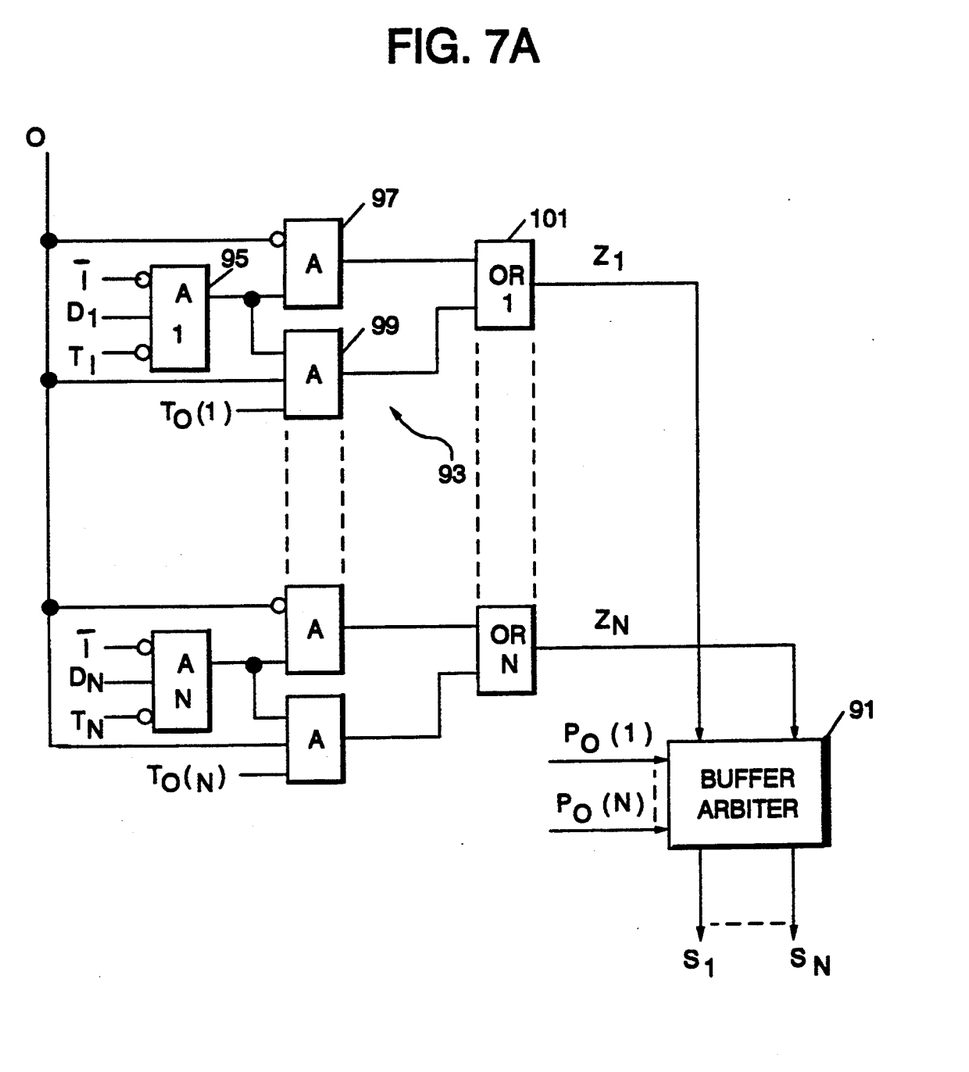
FIG. 7A shows the logic circuit for defining the receiver adapter.
Figure 7B:
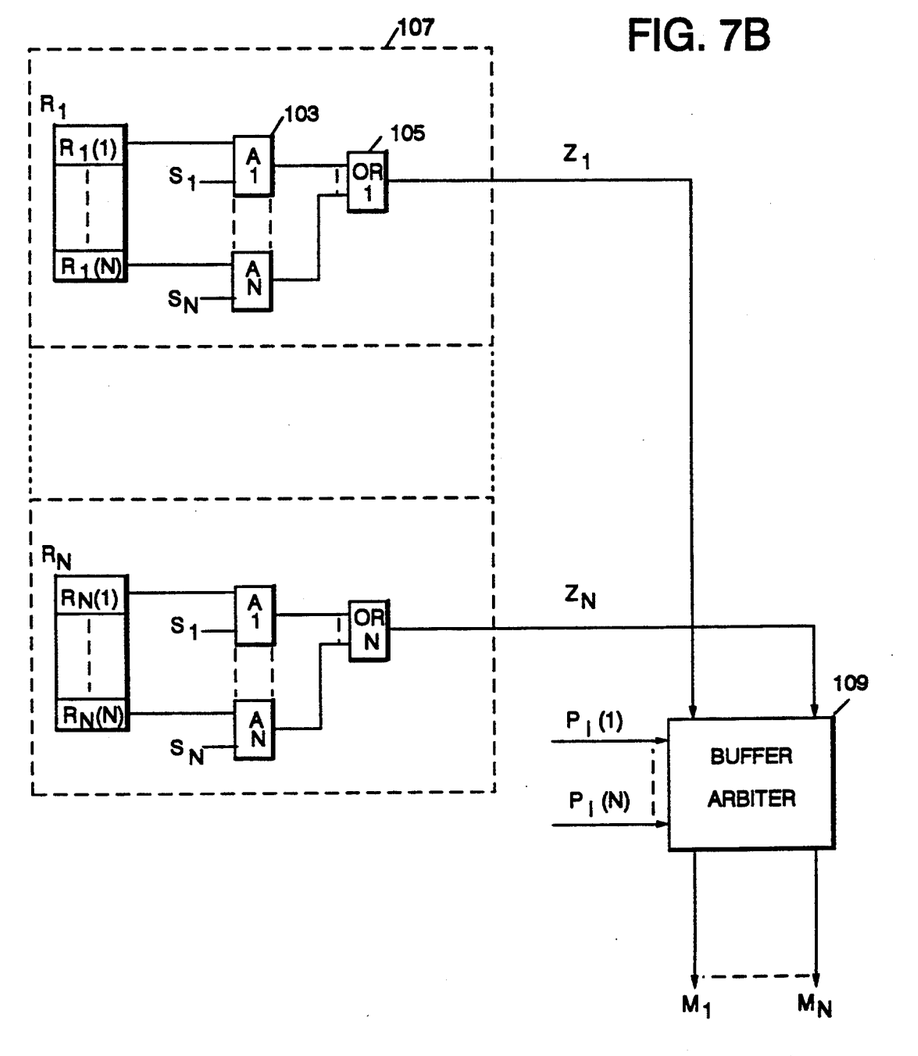
FIG. 7B shows the logic circuit for defining the transmitter adapter.

The control lines are routed to various logic circuits inside of the central arbiter 17, which circuits define the transmitter and receiver adapters. If control line $I = 1$ (indicating that there is at least one nearly full input buffer with data that it can send to at least one non-full output buffer), then the logic circuits of FIGS. 5A and 5B are used. If control line $I = 0$ (indicating that there is no nearly full input buffer having data that it can send to at least one non-full output buffer), then the logic circuits of FIGS. 7A and 7B are used.

First, the logic circuits of FIGS. 5A and 5B will be described. These circuits are used when there is an input buffer that is nearly full and in danger of losing data. The logic circuit shown in FIG. 5A defines the transmitter adapter (the input buffer) by setting output $M_i=1$. If there are two or more nearly full input buffers, then a first buffer arbiter 61 determines which nearly full input buffer (and its adapter) gains access to the bus first. After the transmitter adapter is defined, then the receiver adapter (by way of its output buffer) is defined by setting $S_i=1$, with the logic circuit of FIG. 5B. The receiver adapter is selected by determining if there exists a nearly empty output buffer. If there are none, then the circuit determines if there is a non full output buffer. If there are two or more nearly empty output buffers or if there are two or more not full output buffers, then a second buffer arbiter 89 determines which output buffer gains access to the bus first.

The circuit of FIG. 5A provides two sets of inputs to the first buffer arbiter 61. The first set of inputs, denoted $Z_1$ through $Z_n$ are provided by an n number of AND gates 63. The ith AND gate 63 has one input connected to control line $T_I(i)$ and another input connected to control $A_i$. The output is $Z_i$. The second set of inputs to the first buffer arbiter 61, denoted $P_I(1)$ through $P_I(n)$, are lines that program the first buffer arbiter with the desired priority for the transmitter adapter. The inputs $P_I(i)$ are vectors, each of which is made up of lines $P_{ij}$, where j is the jth bit of the priority for adapter #i (binary encoded). For example, if there are 8 adapters, then each vector $P_I(i)$ will have 3 lines. Adapter #1 has lines $P_{11}$, $P_{12}$ and $P_{13}$, adapter #2 has lines $P_{21}$, $P_{22}$ and $P_{23}$ and so on.

Inputs $P_I(i)$ are programmed to select which adapter is to have priority. For example, if adapter #1 has buffer arbiter, then its input $P_I(1)=111$ in binary numbers, and if adapter #2 has second buffer arbiter, its input $P_I(2)=110$ and so on. The inputs $P_I(n)$ can be static, wherein they are preprogrammed by tying the lines to the desired voltages, or the inputs can be dynamic, wherein the priorities for the adapters change over time.

Figure 6:
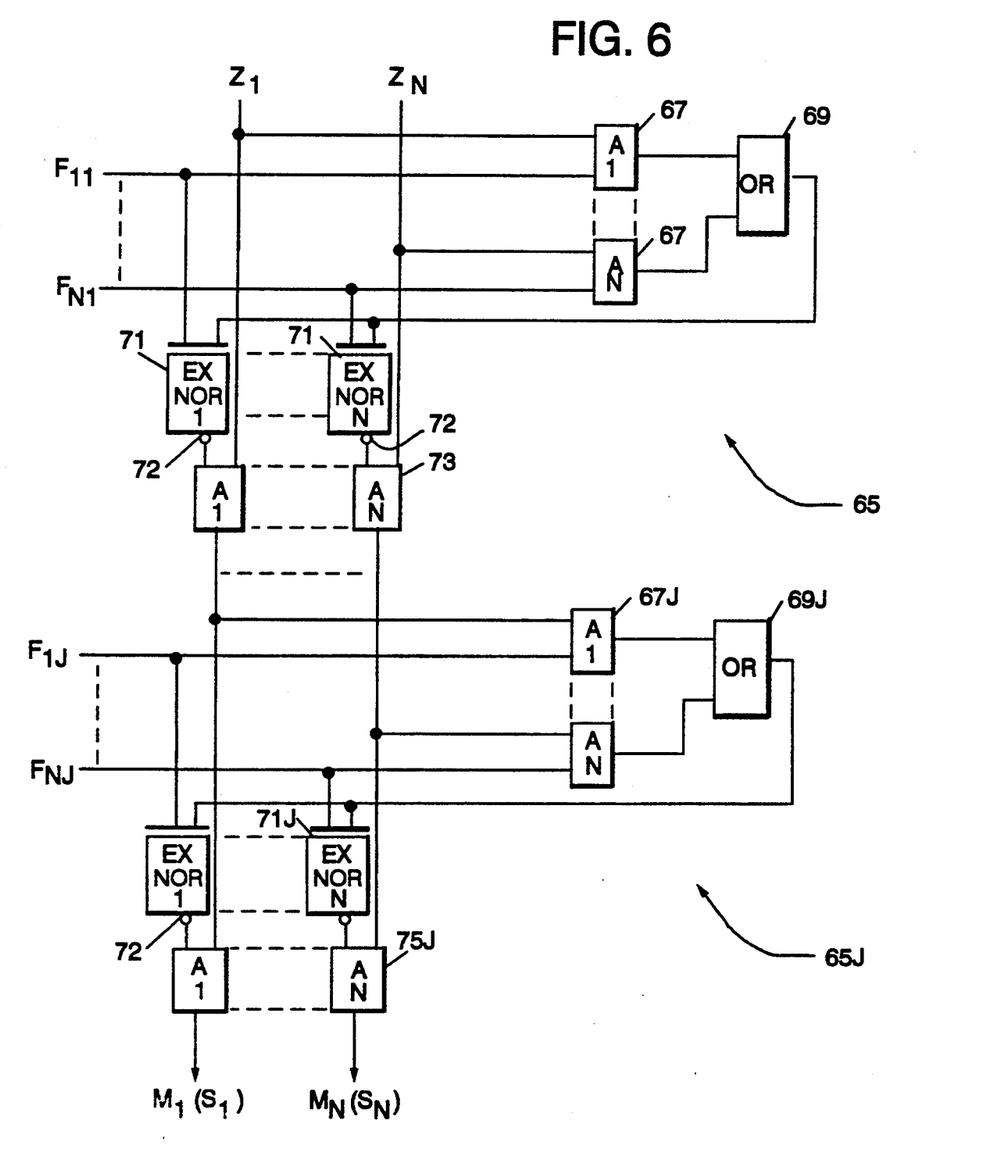
FIG. 6 is a logic circuit of a buffer arbiter.

Referring to FIG. 6, the first buffer arbiter 61 will be discussed. There are provided j stages 65 . . . 65J. Each stage 65 has AND gates 67, the outputs of which are all connected to the inputs of an OR gate 69. The first stage 65 determines priorities between the most significant bit of the inputs $P_I(i)$, and so on with the jth stage 65J determining priorities between the least significant bit of the inputs $P_I(i)$. In each stage, there are provided n AND gates 67, one for each adapter. The ith AND gate has one input connected to a respective input $Z_i$, and the other input connected to line $P_{ij}$, where j is the stage 65 and i is the adapter #i. Thus, for example, the first AND gate of the first stage has inputs connected to $Z_i$ and $P_{11}$. The outputs of the AND gates 67 are connected to respective inputs of the OR gate 69. Each stage also has n EXCLUSIVE OR gates 71. The output of the OR gate 69 is connected to one input of each EXCLUSIVE OR gate 71. The other input of the ith EXCLUSIVE OR gate is connected to line $P_{ij}$. Thus, the first EXCLUSIVE OR gate in the first stage has an input of $P_{11}$. The output of each EXCLUSIVE OR gate 71 is inverted 72 and is connected to an input of an AND gate 73. There are an n number of AND gates 73. In the first stage, the other input of the ith AND gate 73 is connected to input $Z_i$. In the second, third and so on stages, the other input of the ith AND gate 73A is connected to the output of the ith AND gate from the previous stage. The outputs of the AND gates 65J in the last stage of the buffer arbiter are $M_1$ through $M_n$.

These lines, $M_1$ through $M_n$ are input into the logic circuit of FIG. 5B. This circuit defines the receiver adapter. For each adapter, there is provided a circuit 75 shown enclosed in a box formed by dashed lines. Thus, there are n circuits 75. Each circuit has n first stage AND gates 77, 2n second stage AND gates 79, 81 and n OR gates 83. An output buffer is selected by a subcircuit 85 which includes an AND gate 77, an AND gate 79, an AND gate 81 and an OR gate 83. Thus, there are an n number of such subcircuits 85 in each circuit 75. Of the possible n adapters, an ith adapter will be selected as the receiving adapter. Each circuit 75 has an ith subcircuit 85. For the selected transmitter adapter, denoted as adapter #h, all of the first stage AND gates 77 of the hth circuit 75 have one input connected to line $M_h$ from FIG. 5A. In the ith subcircuit 85 of the hth circuit 75, the first stage AND gate 77 has its other input connected to a respective ith bit of register $R_h$. There are two second stage AND gates 79, 81. The "nearly empty" AND gate 79 has the following inputs: line $T_O(i)$, $E_h$, and the output of the first stage AND gate 77. The "not full" AND gate 81 has the following inputs: the output of the first stage AND gate 77, an inverted input from line $E_h$, and an inverted input from line $F_h$. The outputs from the second AND gates 79, 81 are connected to the inputs of the respective OR gate 83. The outputs of all of the OR gates 83 in the ith subcircuits 85 (for the output buffer of adapter #i) are connected to inputs into an OR gate 87, which produces an output $Z_i$.

Lines $Z_i$ through $Z_n$ are input into the second buffer arbiter 89, which is identical to the first buffer arbiter 61 described above. Vector inputs $P_0(1)$ through $P_0(n)$ are provided to the second buffer arbiter 89. These vector inputs are configured in the same manner as the vector inputs $P_I(1)$ through $P_I(n)$ in FIG. 5A, so as to provide which output buffer receives priority over the other output buffers. The outputs of the second buffer arbiter 89 are control lines $S_1$ through $S_n$. These control lines determine which adapter is the receiver adapter for the next block of data on the bus 11.

Referring now to FIGS. 7A and 7B, the logic circuits used for I=0 will be described. The circuit of FIG. 7A is used to find the receiver adapter. The circuit gives priority to adapters with nearly empty output buffers, followed by adapters with not full output buffers. Its outputs are used in the circuit of FIG. 7B to define the transmitter adapter. A transmitter adapter is selected by virtue of its having data for the selected receiving adapter.

The circuit of FIG. 7A uses a third buffer arbiter 91, which is identical to the first buffer arbiter generator 61. The inputs $P_O(1)$ through $P_O(n)$ are vectors and are the same as the inputs $P_O(1)$ through $P_O(n)$ of FIG. 5B. Inputs $Z_1$ through $Z_n$ are respectively provided by n logic circuits 93, each of which is made up of a first stage AND gate 95, two second stage AND gates 97, 99 and a third stage OR gate 101. The first stage AND gates 95 each have the following inputs for the hth output buffer: an inverted I, a $D_h$ and an inverted $F_h$. The "full" second stage AND gate 97 has inputs of an inverted O and the output of the first stage AND gate 95. The "nearly empty" AND gate 99 has inputs of the output of the first stage AND gate 95, the line O and $T_O(h)$. The outputs of the second stage AND gates 97, 99 are connected to the inputs of the OR gate 101. The output of the OR gate is line $Z_h$.

The output of the third buffer arbiter 91 is $S_1$ through $S_n$, which are input into AND gates 103 of FIG. 7B. The circuit of FIG. 7B defines a transmitter adapter, based on the output buffer selected in FIG. 7A. FIG. 7B shows a logic circuit 107 for each transmitter adapter enclosed in a box formed by dashed lines. Thus, there are n circuits 107. Each circuit 107 is connected to a register. Thus, the circuit 107 of the hth transmitting adapter is connected to register $R_h$. Each circuit has n AND gates 103. The ith AND gate 103 has inputs connected to $S_i$ and $R_h(i)$, for the input buffer of the hth adapter. The outputs of all of the AND gates 103 are connected to the inputs of an OR gate 105. The output of the OR gate 105 is line $Z_h$. Lines $Z_1$ through $Z_n$ are connected to the fourth buffer arbiter 109, which is identical to the first buffer arbiter 61. The fourth buffer arbiter 109 has vector inputs $P_I(1)$ through $P_I(n)$, which are the same inputs described in FIG. 5A.

The operation of the present invention will now be described. During the operation of the data processing system, each adapter 15 receives data in its input buffer from its attached resource. The data is intended for one or more resources on the bus. The adapter is able to retrieve the data intended for a specific resource from all of the data in its input buffer. Likewise, the adapter is able to determine the targeted resources for the data on its input buffer. Each adapter is granted access to the bus for transmitting some of this data by the central arbiter 17. Each adapter receives data targeted to it from the bus and into its output buffer. Access to the bus is granted by the central arbiter 17. Data from the output buffer is output to the respective resource.

For simplicity, a uniform block size of data transmitted across the bus is used. This simplifies computations for the thresholds in determining $T_I(i)$ and $T_O(i)$, as well as the optimal data block size transferred across the bus with each access.

To determine which adapter should transmit over the bus and which adapter should receive from the bus, the central arbiter determines if any adapter has a nearly full input buffer and if so if that nearly full input buffer is targeted for any output buffer that is either neither empty or not full. This information is obtained over the control lines $T_I(i)$, $T_O(i)$ and $F_i$. An adapter with an input buffer that is nearly full of data targeted for one or more non-full output buffers is given the buffer arbiter in accessing the bus in order to prevent the input buffer from overflowing and the consequent loss of data. For example, if adapter #1 has a nearly full input buffer, then it sets its line $T_I(1)$ high. If adapter #1 has data for adapter #2, then its register indicates this by setting $R_1(2)$ to 1. If adapter #2 has a non-full output buffer, it sets its line $F_2$ low. The circuit of FIG. 4A produces $A_1=1$, because $R_1(2)=1$ and inverted $F_2=1$. This is used in the circuit of FIG. 4D to produce $I=1$, because $T_I(1)=1$ and $A_1=1$.

If adapter #1 has data in its input buffer for only output buffers that are full, so that $F_i=1$ causing $A_1=0$, then adapter #1 does not gain access to the bus. This is because adapter #1 has no place to transmit its data to. Adapter #1 must wait until a targeted output buffer becomes non-full.

When $I=1$, the circuit of FIG. 5A is enabled (because $T_I(1)$ and $A_1$ both are 1) and the circuit of FIG. 7A is disabled because the first stage AND gates 95 of FIG. 7A are disabled (by the inverted I input). The following algorithm is used to select the input buffer (transmitting adapter) first and then select the output buffer (receiving adapter). First, activate those input buffer priorities for which $T_I(k)$ and $A_k=1$ (see FIG. 5A). This indicates that the input buffer of adapter #k is nearly full and a non-full output buffer exists for its data. Then, the input buffer with the buffer arbiter is selected. The adapter with this input buffer is adapter #h. Next, if $E_h=1$ (that is the input buffer of adapter #h has data for a nearly empty output buffer), then activate those output buffer priorities for which $(R_h(i)$ and $T_0(i))=1$. $R_h(i)=1$ implies that the input buffer of adapter #h has data for the output buffer of adapter #i. If $E_h=0$, then activate those output buffer priorities for which $(R_h(i)$ and (not $F_i))=1$. (Not $F_i)=1$ implies that the output buffer of adapter #i is not full. Finally, select the output buffer with the buffer arbiter.

For example, suppose that the non-full output buffer of adapter #2 is targeted by the input buffer of adapter #1, then the circuits of FIGS. 5A and 5B are used because $I=1$. Because $T_I(1)=1$ and $A_1=1$, then in FIG. 5A, line $Z_1$ is high or 1. If no other adapter has a nearly full input buffer, then the output of the first buffer arbiter generator 61 is $M_1=1$, thereby defining adapter #1 as the transmitter adapter. This enables the circuit 75 for adapter #1 (which controls register $R_1$) in FIG. 5B, because the first stage AND gates 77 are enabled.

However, if another adapter has a nearly full input buffer with data targeted for non-full output buffers, then the first buffer arbiter 61 determines which adapter is a transmitting adapter. For example, if, in addition to adapter #1, adapter #3 has a nearly full input buffer, then both lines $Z_1$ and $Z_3$ are high into the first buffer arbiter 61. The first buffer arbiter determines whether adapter #1 or adapter #3 has the higher priority, using the vector inputs $P_I(1)$ and $P_I(3)$. Suppose adapter #1 has a priority of $P_I(1)=111$ and adapter #3 has a lower priority of $P_I(3)=101$. Referring to FIG. 6, the first stage EXCLUSIVE OR gates 71 filter out the zeros in the most significant bit of the inputs $P_I(1)$ and $P_I(3)$. Since the most significant bits are both 1's, then the first stage has a tie. The output of the first and third EXCLUSIVE OR gates 73 is passed on to the second stage, which compares the intermediate bit. Here, $P_I(1)$ wins because it has a 1, while $P_I(3)$ has a 0. Thus, the output of the first EXCLUSIVE OR gate is 1 and is passed onto the third stage, while the output of the third EXCLUSIVE OR gate is 0 and is blocked from the third stage. The outputs of the arbiter 61 are $M_1=1$ and all the other outputs are 0.

In FIG. 5B, the circuit 107 for adapter #1 is enabled. The first stage AND gate 77 determines which output buffers are targeted by adapter #1. Because $R_1(2)=1$, then the subcircuit 85 for adapter #2 is enabled. The second stage AND gates 79, 81 determine if any of the targeted output buffers are nearly empty. If so, $E_1=1$, thereby disabling the gate circuits of any output buffers that are merely not full. $E_1=1$ because, using the circuit of FIG. 4C, $R_1(2)=1$ and $T_0(2)=1$. Thus, the nearly empty AND gate 79 produces a high output, wherein line $Z_1$ into the second buffer arbiter 89 is high. If not other adapter has a nearly empty output buffer, then the second buffer arbiter produces $S_2=1$, thereby defining adapter #2 as the receiver adapter.

However, if, for example, adapter #3 has a newly empty output buffer and is targeted by the input buffer of adapter #1, then the line $Z_3$ into the second buffer arbiter 89 is high. The second buffer arbiter determines whether adapter #2 or adapter #3 has the higher priority, using vector inputs $P_O(2)$ and $P_O(3)$. If adapter #2 has the higher priority of the two, then $S_2=1$ and all other S outputs from the generator 89 are 0.

If any of the output buffers targeted by the input buffer of adapter #1 are not full, as opposed to being nearly empty, then the "not full" AND gates 81 are enabled. This is because the inverse of $E_i=1$ and the inverse of $F_i=1$. Selection of not full output buffers is thus allowed.

Thus, using the circuits of FIGS. 5A and 5B, the central arbiter controls the adapters having access to the bus for the next transfer of data across the bus. The adapters having nearly full input buffers that are targeted for adapters with non-full output buffers are given the buffer arbiter. First, the transmitter adapter with the buffer arbiter is defined. Once the transmitter adapter is defined, then the receiver adapter is defined from those output buffers which are targeted by the transmitter adapter. Those output buffers that are nearly empty are given higher priority over those output buffers that are not full.

If there are no adapters with a nearly full input buffer, then $I=0$ and the circuits of FIGS. 7A and 7B are used. The following algorithm is used to select the output buffer first and then to select the input buffer. First, if $O=1$ (that is a nearly empty output buffer exists for which there is data in some adapter's input buffer), then activate those output buffer priorities for which ($T_O(k)$ and $Dk)=1$. $D_k=1$ implies that data exists for the output buffer of adapter #k in at least one other adapter. Otherwise, activate those output buffer priorities for which ($D_k$ and (not $F_k$))=1 (that is, all that are not full). Then, select the output buffer with the buffer arbiter. Let this be adapter #h. Next, activate those input buffer priorities for which $R_i(h)=1$. Only the hth bit of every target register is examined. Finally, select the input buffer with the highest activated priority.

For example, suppose that adapter #2 has a nearly empty output buffer. The central arbiter 17 determines if there is another adapter with data targeted for the output buffer of adapter #2. Supposing that the input buffer of adapter #1 has data targeted for adapter #2, $O=1$. This is because, using the circuit of FIG. 4B, $R_1(2)=1$ to produce $D_2=2$. Using the circuit of FIG. 4E, $T_O(2)=1$ (the output buffer of adapter #2 is nearly empty) and $D_2=1$ to produce $O=1$. With $O=1$, the "nearly empty" AND gates 99 of FIG. 7A are all enabled and the "not full" AND gates 97 are all disabled. The other inputs into the AND gate 99 for the output buffer of adapter #2 are all 1, because $T_O(2)=1$ and the output of the first stage AND gate 95 is 1 (due to ((not I) and $D_2$ and (not $F_2$))=1). This produces an input on line $Z_2$ into the third buffer arbiter 91.

If there are two or more adapters that have active Z lines into the third buffer arbiter 91, then the adapter with the buffer arbiter is selected by the third buffer arbiter 91. For example, if adapter #3 has a nearly empty output buffer, for which data exists, then input vectors $P_O(2)$ and $P_O(3)$ are compared by the third buffer arbiter 91. The third buffer arbiter 91 produces an output $S_h$. If adapter #2 has the buffer arbiter, then $S_2=1$.

This output of the third buffer arbiter 91 enables all of the AND gates 103 relating to adapter #2 in the circuit of FIG. 7B. Any adapter #i having data for the output buffer of adapter #2 has its register set, $R_i(2)=1$. Thus, if adapter #1 has data for adapter #2, $R_1(2)=1$. 1. This causes line $Z_1$ to go high. If no other adapters have data for adapter #2, then the output of the fourth buffer arbiter 109 is $M_1=1$ and all other $M_i$ outputs are 0. If other adapters have data for adapter #2, such as adapter #3, then the fourth buffer arbiter 109 compares input vectors $P_I(1)$ and $P_I(3)$, which are the same as in FIG. 5A. If adapter #1 has a higher priority, then the fourth buffer arbiter 109 produces $M_1=1$.

The central arbiter 17 works in the background of the bus 11, both physically and temporally. The central arbiter receives and sends information to and from the adapters over control lines that are separate from the bus 11. Furthermore, the central arbiter determines which adapters will access the bus at the same time that data is being transmitted across the bus.

Data is transmitted onto the bus in block sizes. For simplicity, the block sizes are uniform. The clock 16 synchronizes all of the adapters and the central arbiter. Thus, for example, during a first bus cycle, adapter #1 transmits a block of data across the bus to adapter #2. In addition, during the first bus cycle, the central arbiter determines the next set of adapters to have access to the bus for the second bus cycle. For example, for the second bus cycle, the central arbiter determines that adapter #1 will receive a block of data from adapter #3.

An advantage that the present invention has over prior art arbiters is the ability to accommodate the latest information from the adapters. With the present invention, status changes do not disrupt the central arbiter. Suppose, for example, that adapter #1 has data for adapter #2, yet the input buffer of adapter #1 is not yet full during one bus cycle. If no other input buffers are not yet full either, then adapter #1 may not gain access to the bus because of a low priority. However, all of a sudden, near the end of the bus cycle, the input buffer of adapter #1 becomes nearly full, activating line $T_i(1)$. Conventional latch circuits can be used to turn the central arbiter 17 on just before the beginning of the next bus cycle. The central arbiter decides bus access with the most current information, thereby giving adapters #1 and 2 access to the bus in order to relieve the nearly full input buffer of adapter #1.

Although the present invention has been described with reference to LANs, the present invention can be used in other applications requiring data transfer between plural resources. For example, the present invention can be used in conjunction with automatic teller machines (ATMs) and other switching devices. Furthermore, the present invention can be utilized in multimedia applications, which typically require high data transmission speeds and bandwidths.

The foregoing disclosure and the showings made in the drawings are merely illustrative of the principles of this invention and are not to be interpreted in a limiting sense.

We claim:

1. A method of controlling access by plural resources to a bus that is shared by said resources, each of said resources having a first storage means for storing data to be transmitted onto said bus and a second storage means for receiving data from said bus, each of said first and second storage means having a data storage capacity, said method comprising the steps of:
   a) obtaining fullness information on an amount of data contained in each of said first storage means and said second storage means with respect to the respective capacity thereof; and b) determining from said fullness information which resource is to have access to the bus for transmitting data from its first storage means and which resource is to have access to the bus for receiving data into its second storage means.

2. The method of claim 1, wherein said data in each of said first storage means is targeted to be sent to one or more of said second storage means, further comprising the steps of:

a) for each first storage means, obtaining target information on an identity of the second storage means targeted by data in said respective first storage means; and b) said step of determining which resources are to have access to the bus further comprising using said target information along with said fullness information to determine which resource is to have access to the bus for transmitting data from its first storage means and which resource is to have access to the bus for receiving data into its second storage means.

3. The method of claim 2 wherein said step of determining which resources are to have access to said bus further comprises the steps of determining from said fullness information and said target information if there exists a first set of said first and second storage means comprising a first storage means that is nearing fullness with data for a non-full second storage means and if so, then granting said resources having said first set of first and second storage means access to said bus.

4. The method of claim 3 wherein the step of determining which resources are to have access to said bus further comprises the steps of determining, if there exists no first set, then if there exists a second set of said first and second storage means comprising a second storage means that is nearly empty and a first storage means with data that is targeted for said nearly empty second storage means, and if so, then granting said resources having said second set of said first and second storage means access to said bus.

5. The method of claim 2 wherein each of said first storage means has a priority value, said step of determining which resources are to have access to the bus further comprising the step of using said priority values along with said target information and said fullness information to determine which resource has access to the bus for transmitting data.

6. The method of claim 2 wherein each of said second storage means has a priority value, said step of determining which resources are to have access to the bus further comprising the step of using said priority values along with said target information and said fullness information to determine which resource has access to the bus for transmitting data.

7. The method of claim 2 wherein each of said first storage means has a first range of priority values and each of said second storage means has a second range of priority values, said step of determining which resources are to have access to the bus further comprising the step of using said priority values along with said target information and said fullness information to determine which resource has access to the bus for transmitting data and which resource has access to the bus for receiving data.

8. The method of claim 7 wherein said step of determining which resources have access to the bus based on said priority values, said target information and said fullness information further comprises the step of determining which first storage means has priority over the other first storage means by comparing significant bits at like bit positions of said first priority values.

9. The method of claim 1 wherein said step of determining which resources have access to the bus is performed to determine which resources are to have future access to the bus and is performed simultaneously with the transmission of data on said bus.

10. A data processing system having plural resources that share a bus interconnecting said resources, each of said resources having a first storage means for storing data to be transmitted onto said bus and a second storage means for receiving data from said bus, each of said first and second storage means having a data storage capacity, said data processing system comprising:

a) means for obtaining fullness information on the amount of data contained in each of said first storage means and said second storage means with respect to the respective capacity thereof;

b) means for selecting from said fullness information which resource is to have access to the bus for transmitting data from its first storage means and which resource is to have access to the bus for receiving data into its second storage means; and c) means for granting said selected resources access to said bus.

11. The system of claim 10, wherein said data in each of said first storage means is targeted to be sent to one or more of said second storage means, said data processing system further comprising:

a) for each first storage means, means for obtaining target information on an identity of the second storage means targeted by data in said respective first storage means; and b) said means for selecting further comprising means for using said target information along with said fullness information to determine which resource is to have access to the bus for transmitting data from its first storage means and which resource is to have access to the bus for receiving data into its second storage means.

12. The system of claim 11 wherein said means for using said target and said fullness information further comprises first means for determining from said fullness information and said target information if there exists a first set of said first and second storage means comprising a first storage means that is nearing fullness with data for a non-full second storage means and if so, then selecting resources to have access to said bus.

13. The system of claim 12 wherein the means for using said target and said fullness information further comprises second means for determining, if there exists no first set, then if there exists a second set of said first and second storage means comprising a second storage means that is nearly empty and a first storage means with data that is targeted for said nearly empty second storage means, and if so, then selecting said resources to have access to said bus.

14. The system of claim 11 wherein each of said first storage means has a range of priority values, wherein said means for using said target and said fullness information further comprises means for determining from said priority values which resource is to have access to the bus.

15. The system of claim 11 wherein each of said second storage means has a range of priority values, wherein said means for using said target and said fullness information further comprises means for determining from said priority values which resource is to have access to the bus.

16. The system of claim 11 wherein each of said first storage means has a first range of priority values and each of said second range of storage means has a second priority values, wherein said means for using said target and said fullness information further comprises means for determining from said first and second priority values which resources are to have access to the bus.

17. The system of claim 10 further comprising means for transmitting said fullness information from said resources to said means for selecting, said transmitting means being distinct from said bus.

18. A flow controller for use in a data processing system that has plural resources that communicate over a shared bus, said flow controller comprising:
 a) plural adapters connected to said bus, there being at least one adapter for each resource, each adapter comprising a transmitting buffer, a receiving buffer and a target register, said target register of each adapter containing information on the receiving buffers targeted by data in the respective transmitting buffer;
 b) an arbiter that is connected to each adapter by control line means, said control line means for transmitting to said arbiter from each adapter information regarding fullness of the respective transmitting buffer, emptiness and fullness of respective receiving buffer and contents of the target register into a respective arbiter target register located in said arbiter, said control line means also for transmitting to each of said adapters from said arbiter information regarding if an adapter is to access the bus with either its transmitter buffer or its receiving buffer.

19. The flow controller of claim 18 wherein said arbiter further comprises:
 a) means for determining from said information received from said adapters over said control line means if there exists a first set of transmitting and receiving buffers comprising a transmitting buffer that is nearing fullness with data for a non-full receiving buffer; and
 b) means for granting said adapters having said first set of transmitting and receiving buffers access to said bus.

20. The flow controller of claim 19 wherein said arbiter further comprises means for determining the priority between plural transmitting and receiving buffers.

* * * * *